US008456277B2

(12) United States Patent
Gillert et al.

(10) Patent No.: US 8,456,277 B2
(45) Date of Patent: Jun. 4, 2013

(54) LOCKING CYLINDER AND CLOSING METHOD

(75) Inventors: Joachim Gillert, Köln (DE); Normann Ketzler, Hergenrath (BE); Hermann Roeser, Mechernich (DE); Andreas Steinkamp, Bruehl (DE)

(73) Assignee: DOM-Sicherheitstechnik GmbH & Co. KG, Bruhi (DE)

( * ) Notice: Subject to any disclaimer, the term of this patent is extended or adjusted under 35 U.S.C. 154(b) by 888 days.

(21) Appl. No.: 11/518,538

(22) Filed: Sep. 8, 2006

(65) Prior Publication Data

US 2007/0115094 A1 May 24, 2007

Related U.S. Application Data

(63) Continuation of application No. PCT/EP2005/002272, filed on Mar. 4, 2005.

(30) Foreign Application Priority Data

Mar. 12, 2004 (DE) ......................... 10 2004 013 061
Aug. 24, 2004 (DE) ......................... 10 2004 041 518

(51) Int. Cl.
*B60R 25/00* (2006.01)
*G05B 19/00* (2006.01)
*G06F 7/00* (2006.01)
*H04B 1/00* (2006.01)

(52) U.S. Cl.
USPC .......... 340/5.61; 340/5.7; 340/574; 70/283.1; 70/278.3

(58) Field of Classification Search
USPC .................... 340/5.61, 5.7, 574, 539; 70/277, 70/280, 278.1, 223; 310/266, 112; 341/35
See application file for complete search history.

(56) References Cited

U.S. PATENT DOCUMENTS 3,196,440 A * 7/1965 Weinstein .................... 340/5.62
3,564,501 A * 2/1971 Flook, Jr. ...................... 340/5.64
3,584,484 A * 6/1971 Hallmann et al. .............. 70/276
3,733,861 A 5/1973 Lester ............................. 70/153

(Continued)

FOREIGN PATENT DOCUMENTS

DE 297 03 559 U1 6/1997
DE 19829927 1/2000

(Continued)

OTHER PUBLICATIONS

DE App. No. 10 2004 041 518.8-31, German Examination Report dated Mar. 9, 2010.

(Continued)

*Primary Examiner* — Nam V Nguyen
(74) *Attorney, Agent, or Firm* — Larry E. Henneman, Jr.; Henneman & Associates, PLC

(57) ABSTRACT

A locking cylinder is proposed for installation in a lock, with a locking element for actuating a lock bolt or the like, and an actuating element, preferably a knob, wherein the actuating element is normally disengaged from the locking element, and with a coupling for connecting the locking element to the actuating element after receiving an identification code from an associated transponder.

An electromechanical converter is associated with the actuating element, which converter converts an actuation of the actuating element into electrical energy which is used to support the wireless communication with the transponder and/or the engaging of the coupling when a valid identification signal is received.

27 Claims, 3 Drawing Sheets

U.S. PATENT DOCUMENTS

| | | | | |
|---|---|---|---|---|
| 5,061,923 | A * | 10/1991 | Miller et al. | 340/5.31 |
| 5,088,383 | A * | 2/1992 | Wardle et al. | 91/361 |
| 5,694,798 | A * | 12/1997 | Nunez et al. | 70/283 |
| 5,790,034 | A * | 8/1998 | Khoury | 340/5.64 |
| 5,831,417 | A * | 11/1998 | Chu | 322/1 |
| 5,896,026 | A * | 4/1999 | Higgins | 320/166 |
| 6,038,895 | A * | 3/2000 | Menke et al. | 70/278.1 |
| 6,052,063 | A * | 4/2000 | Miller et al. | 340/5.31 |
| 6,334,347 | B1 * | 1/2002 | Iscla | 70/278.3 |
| 6,370,928 | B1 | 4/2002 | Chies et al. | 70/278.3 |
| 6,741,160 | B1 * | 5/2004 | Dawson et al. | 340/5.55 |
| 6,812,594 | B2 * | 11/2004 | Face et al. | 307/119 |
| 6,845,642 | B2 * | 1/2005 | Imedio Ocana | 70/277 |
| 2004/0055346 | A1 | 3/2004 | Gillert | 70/276 |
| 2004/0068935 | A1 * | 4/2004 | Ichikawa et al. | 49/25 |

FOREIGN PATENT DOCUMENTS

| | | |
|---|---|---|
| EP | 0462316 | 11/1990 |
| EP | 1378620 | 1/2004 |
| FR | 2728613 | 6/1996 |
| WO | WO 96/02721 | 2/1996 |
| WO | WO 02/29187 | 4/2002 |

OTHER PUBLICATIONS

Int'l App. No. PCT/EP2005/002272, International Search Report and Written Opinion dated Jun. 13, 2005.

Int'l App. No. PCT/EP2005/002272, International Preliminary Report on Patentability dated Feb. 8, 2007.

Int'l App. No. PCT/EP2005/002272, International Preliminary Report on Patentability dated Feb. 8, 2007 (English Translation).

* cited by examiner

LOCKING CYLINDER AND CLOSING METHOD

This application is a continuation of International Application No. PCT/EP05/002272 filed on Mar. 4, 2005 by the same inventors (published under PCT Article 21(2) in German and not English), which claims priority to Application No. DE10 2004 013 061.2 filed in Germany on Mar. 12, 2004 and Application No. DE10 2004 041 518.8 filed in Germany on Aug. 24, 2004, all of which are incorporated herein by reference in their entirety.

BACKGROUND OF THE INVENTION

This invention relates to a locking cylinder for installation in a lock, with a locking element for actuating a lock bolt or the like, with an actuating element, preferably a knob, wherein the actuating element is normally disengaged or uncoupled from the locking element, and with a coupling for connecting the locking element to the actuating element after an identification code is received from an associated transponder.

This invention also relates to a method for carrying out a locking process of a lock, in particular that of a door.

The generic locking cylinder is a so-called electronic locking cylinder. The locking cylinder may, for example, be a profile cylinder.

Conventional locking cylinder have mechanical pin guard locking elements and may be unlocked by means of a mechanical key in order to lock and unlock a door lock by means of a locking cam.

Electronic locking cylinders generally have a control device of an electronic type. As soon as an identification code is accepted by the electronic control device, a coupling is actuated to connect the locking element to the actuating element, thus enabling a user to lock or unlock the lock by means of the actuating element.

A suitable drive, for example a motor, may be provided inside the locking cylinder for actuating the coupling.

Here the access authorization can be examined by means of a mobile transponder (identification carrier) in which data relevant to the examination of the access authorization (identification code or access authorization code) are stored in electronic form.

In many systems provision is made for the locking cylinder to be connected to a power supply network. However, this requires relatively expensive cabling, which applies particularly when provision is made for substituting an existing conventional mechanical locking cylinder with an electronic locking cylinder.

However, a method is also known for equipping electronic locking cylinders with their own energy supply (energy accumulator in the form of a battery or an accumulator). Such electronic locking cylinders are also suitable for upgrading and for simple integration in existing locking systems.

For unlocking such electromechanical locking devices (electronic locking cylinders) a mechanical locking element (e.g. a locking cam) is often coupled to an actuating element (handle, preferably a knob or the like). The actual locking or unlocking process is then carried out by actuating the actuating element, thereby saving energy.

A further measure for minimizing the energy consumption consists in switching the electronic part of the electromechanical locking device to an inactive mode when not in use (sleep mode). In the inactive mode the electronics of the locking cylinder is in a condition in which the independent energy supply is loaded (burdened) as little as possible, ideally with no load at all.

Nevertheless a not inconsiderable amount of energy is consumed in such electronic locking cylinders, at least during the engaging process, so that such locking cylinders can be designed in any case with low maintenance, but not largely maintenance-free.

SUMMARY OF THE INVENTION

The object of this invention is to indicate an improved locking cylinder and an improved locking process.

This object is achieved by a locking cylinder for installation in a lock, with a locking element for actuating a lock bolt or the like, with an actuating element, preferably a knob, wherein the actuating element is normally disengaged or uncoupled from the locking element, and with a coupling for connecting the locking element to the actuating element after an identification code is received from an associated transponder, wherein an electromechanical converter is associated with the actuating element, which converter converts an actuation of the actuating element into electrical energy which is used for supporting wireless communication with the transponder and/or the engagement of the coupling when a valid identification signal is received.

The above object is further achieved by a method for carrying a locking operation of a lock, in particular that of a door, with the following steps:

actuation of an actuating element of a locking cylinder of the lock, wherein mechanical energy is transmitted thereby;
conversion of the mechanical energy transmitted to the actuating element into electrical energy;
supply of a control device with the electrical energy, wherein the control device establishes wireless communication with a transponder;
receiving in the control device a code from the transponder and checking the same for validity; and
actuating a coupling for connecting the actuating element to a locking element if the identification code received is valid.

In a mechatronic locking cylinder access control electronics and an electromechanical (actually a "mechanico-electrical") energy converter is provided. The energy converter is operated by actuating a handle (actuating element) and energy is generated. The electronics, for example, are supplied with the energy generated and are operated at least in a supporting manner. The supply of energy simultaneously initiates the establishment of a communication with an ID tag (transponder). This is suitably activated by the signal from the locking cylinder electronics in order to communicate with the control electronics of the locking cylinder. If the ID tag is authorized, a coupling element, for example, is actuated to disengage or engage the locking cam of the cylinder so that the bolt or latch of the lock can be actuated.

It is also possible for the electrical energy supplied by the energy converter to be used only to wake a control device from a sleeping mode, thereby providing support by means of the mechanical actuation. Here the control device is fed from other sources of energy (e.g. battery, mains, etc.) after waking.

The electrical energy generated during rotation of the actuating element may be used to establish a radio connection to the transponder. Here it may be possible, when an active battery powered transponder is used, to wake it from a sleep mode by means of a "burst" signal so that the transponder subsequently transmits its identification code. The code is received (preferably still supported by the energy generated by rotation of the knob) and the coupling for connecting the knob to a bolt or other locking element is also preferably actuated on the basis of the energy generated by the rotation of the knob.

The method according to the invention preferably means that the user need only rotate the actuating element (the knob) until the door opens. It also means the following: the processes involved in the energy conversion, authentication and locking itself may be merged together so that they act as one process and handling is extremely simple, as if no authentication had taken place.

Consequently it is possible to design the locking cylinder ideally as fully battery-less, i.e. without its own energy source. The energy is supplied solely by rotating the knob (or other mechanical movement on an element suitable for this purpose, e.g. by depressing a lever, pressing together two levers, etc.).

Even when an additional energy source (such as battery supply or an accumulator) cannot be fully dispensed with, this energy source may either be very small or extremely long-lived, since additional energy is generated by rotating the knob.

In particular, it is possible, when a rechargeable energy source is used, preferably an accumulator and/or a capacitor, for provision to be made for the rechargeable energy source to be charged by actuating the actuating element.

Furthermore, the transponder, which is used in connection with such a locking cylinder, may be a passive transponder or an active transponder. Passive transponders are of prior art. A passive transponder does not have its own energy supply.

The electromechanical converter may be designed as an electric machine (generator), as a combination of a permanent magnet(s) with one or a plurality of induction coils, as a piezo-converter or the like. If a generator is used, a gear or the like may also be provided, for example, to achieve a speed optimisation for driving the generator.

The electromechanical converter may, for example, be arranged inside an actuating element, particularly a knob.

In the case of a passive transponder, the passive transponder is also preferably supplied partially by the energy which is generated by actuating the actuating element.

Alternatively the transponder may be an active transponder, i.e. a battery-backed transponder, which, preferably, is generally in a sleep mode so that the battery is only loaded in the case of locking. In this case, the battery may last several years.

In the method according to the invention it is preferable, according to one alternative embodiment, if the electrical energy generated by actuating the actuating element is used directly to operate the control device and/or the coupling.

Alternatively it is also possible to store the electrical energy generated by actuating the actuating element initially at least partially in a rechargeable electrical energy storage such as an accumulator and/or capacitor.

It is self-evident that the characteristics mentioned above and yet to be explained in the following can be used not only in the combination indicated but also in other combinations or alone without departing from the scope of this invention.

BRIEF DESCRIPTION OF THE SEVERAL VIEWS OF THE DRAWING

Exemplary embodiments of the invention are shown in the drawing and are explained in greater detail in the following description, where.

DETAILED DESCRIPTION OF THE INVENTION

Figure 1:
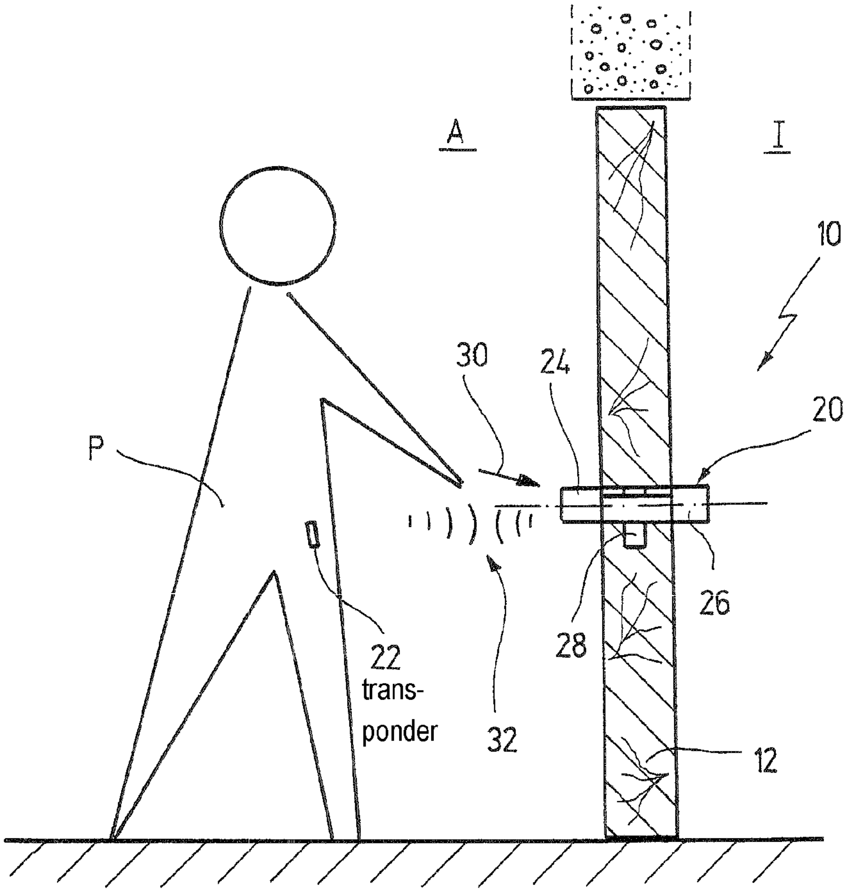
FIG. 1 shows a diagrammatic representation of a situation in which a person unlocks a door in whose lock a locking cylinder according to a first embodiment of this invention is installed.

In FIG. 1 a locking system is generally denoted by 10.

The locking system 10 is provided for a door 12, which separates an outside A from an inside I. Locking system 10 enables persons P to gain access to the inside I only when they are authorized to do so.

Locking system 10 has a locking cylinder 20 which can be designed, for example, as a profile cylinder.

Locking cylinder 20 is a so-called electronic locking cylinder. In this embodiment the locking cylinder is independent of a power supply network. Furthermore, it does not have its own energy supply. Alternatively it is possible for locking cylinder 20 to have a rechargeable energy source, such as an accumulator and/or a capacitor. Finally, it is also possible for locking cylinder 20 to have a non-rechargeable battery or the like.

Person P carries a transponder 22 for his/her identification and for establishing whether he/she is authorized to gain access to inside I.

Furthermore, an outer knob 24 and an inner knob 26 are provided in door 12, each of them forming actuating elements.

Locking cylinder 20 also has a locking element of intrinsically conventional design, in the form of a locking bit (cam) 28. Locking bit 28 actuates a locking bolt of a lock of a door 12 not shown in greater detail.

In a normal condition locking bit 28 is disengaged (decoupled) at least from the outer knob 24. A person P, which rotates outer knob 24 in the normal condition could therefore neither lock nor unlock the lock of door 12.

Locking cylinder 20 on the one hand has means for entering into communication (radio contact, for example) with transponder 22 of person P, and on the other has a coupling, not shown in detail, which is designed for coupling (connecting) outer knob 24 to locking bit 28.

Moreover, locking cylinder 20 has a control device, not shown in detail, which controls and coordinates the engaging and disengaging of the coupling and the communication with transponder 22.

The energy supply for the control device and the coupling for connecting outer knob 24 and locking bit 28 are provided for in this embodiment as follows: person P, which desires admission to inner space I, exerts an actuating force 30 on outer knob 24. The mechanical energy exerted thereby on knob 24 is converted into electrical energy by means of a converter, not shown in detail, which energy supplies the control device and/or the coupling.

Although it appears possible, theoretically, for the energy supply of locking cylinder 20 to be derived exclusively from actuating force 30 of person P, it is in practice generally the case that actuating force 30 only makes a contribution, preferably a major contribution, to the electrical energy supply of locking cylinder 20. In this case a battery and/or rechargeable energy accumulator (such as an accumulator and/or a capacitor) can be provided for supplying the remainder of the energy required.

It is also possible for the control device of locking cylinder 20 to be in a "sleep mode" and to be initially wakened by the electrical energy derived from actuating force 30, so that a polling or inquiry procedure for authorized transponders 22 can then be made.

Such an inquiry procedure takes place as follows. As indicated diagrammatically at 32, a wireless connection 32 (a radio connection, for example) to transponder 22 is first established. If transponder 22 is an active transponder, it is first "woken" by the inquiry signal, whereupon transponder 22 transmits the stored identification code to locking cylinder 20. There, a comparison is made in the control device to determine whether the identification code is authorized. If this is the case the control device initiates the engaging of the coupling to connect outer knob 24 and locking bit 28. Person P can then unlock door 12, as long as the coupling is engaged to gain access to inner space I.

After a certain time the coupling is again released (disengaged) and the control device is returned to a "sleep mode".

In practice the actuation of outer knob 24, the waking of the control device, establishment of wireless connection 32, examination of the access authorization in the control device and engaging the coupling all take place immediately after one another so that these processes more or less merge in time for person P. In other words it is possible here for person P only to actuate knob 24 (for example, rotate it) for the purpose of gaining access to inner space I. During this rotation the mechanical energy is converted to electrical energy and the authorization procedure takes place, and whilst the user is actuating outer knob 24 the coupling is engaged so that further actuation results in the release of the lock of door 12. Person P may therefore easily open door 12 with a handle.

The electromechanical energy converter which converts actuating force 30 and the energy expended by person P into electrical energy may, for example, be an electric machine (generator), but it may also be a combination of a permanent magnet(s) with one or plurality of induction coils, and the converter may be designed as a piezo-converter or the like, etc. Furthermore, a reduction gear may be coupled with the energy converter, particularly the electrical generator, for obtaining an optimum energy conversion.

Figure 2:
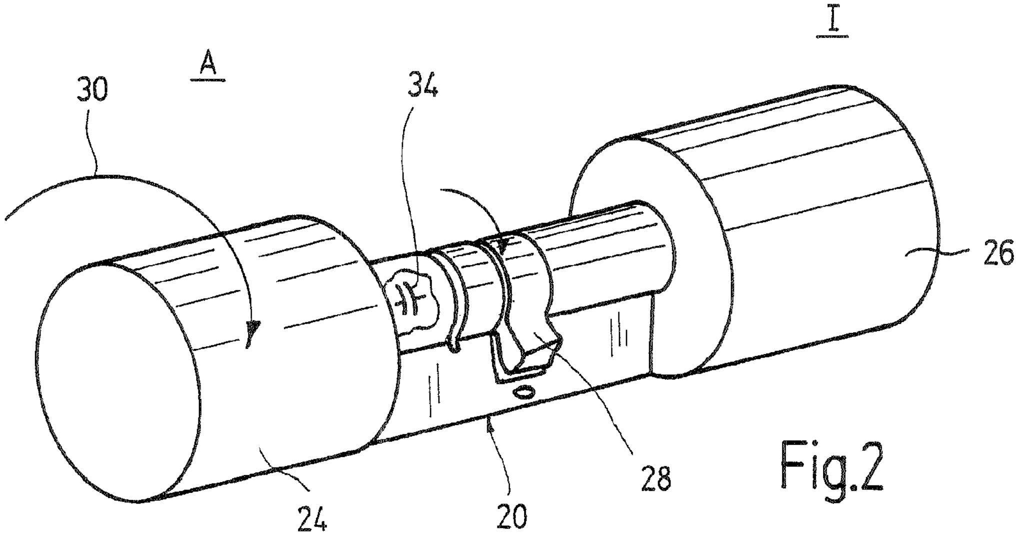
FIG. 2 shows a perspective representation of a further embodiment of a locking cylinder according to the invention.
Figure 3:
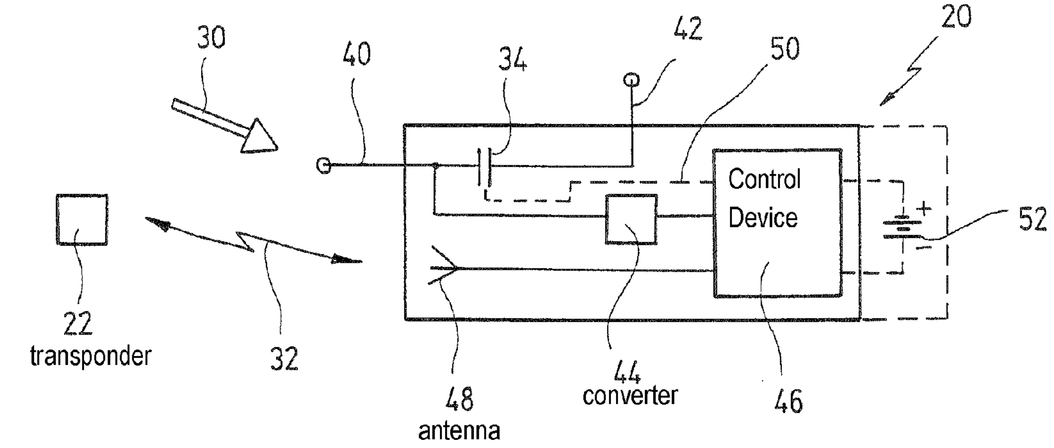
FIG. 3 shows a schematic block diagram of a further embodiment of the locking cylinder according to the invention.
Figure 4:
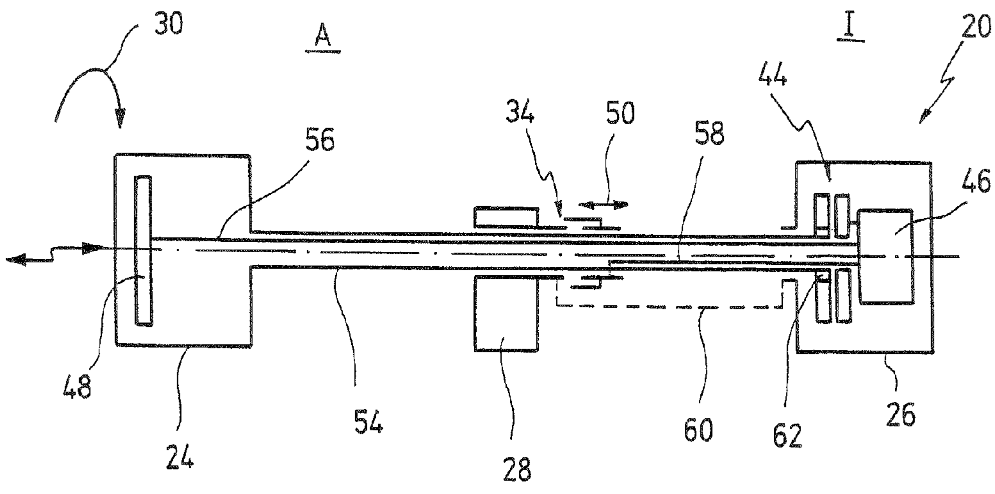
FIG. 4 shows a schematic longitudinal sectional view of a further embodiment of the locking cylinder according to the invention.

The following embodiments of locking cylinders according to FIGS. 2 to 4 are all based on the embodiment described above with reference to FIG. 1. The same elements are therefore provided with the same reference numbers. Only the relevant differences relative to the embodiment shown in FIG. 1 are explained hereafter.

FIG. 2 shows, as the locking cylinder, a profile cylinder 20 with an outer knob 24 and an inner knob 26. FIG. 2 also indicates, in diagrammatic form, coupling 34 as an element inside the cylinder housing for connecting and separating outer knob 24 and locking cam 28, respectively.

FIG. 3 shows an embodiment of a locking cylinder according to the invention in diagrammatic form. Locking cylinder 20 has an actuating element 40 (for example outer knob 24), which can be connected to locking element 42 by coupling 34.

Actuating element 40 is also connected to an electromechanical converter 44, which converts actuating force 30 to electrical energy and supplies it to a control device 46. Control device 46 is connected to an antenna 48 via which the wireless connection is made between control device 46 and transponder 22.

At 50 an actuator is also indicated diagrammatically which is actuated by control device 46 in order to open or separate coupling 34. It is also possible for coupling 34 to open automatically (e.g. by means of a mechanical pre-tensioning spring) so that actuator 50 must be designed so that it only acts on one side.

Instead of a coupling 34 a control element may be used which allows or prevents coupling depending on its position.

An optional energy source is shown at 52. Ideally actuating force 30 is sufficient to supply control device 46 with electrical power during communication with transponder 22 and for actuating coupling 34. However, it is also possible for an additional electrical energy storage, such as a battery, an accumulator and/or a capacitor, to be provided so that actuating force 30 need only provide a part of the electrical power required.

FIG. 4 shows a diagrammatic design in which outer knob 24 extends via a through shaft into the inside of inner knob 26. This shaft is denoted by 54 in FIG. 4 and is designed as a hollow shaft.

Control device 46 is arranged inside inner knob 26. Antenna 48 is arranged inside outer knob 24 and is connected through hollow shaft 54, by means of an electric cable 56, to control device 46.

It is also shown that locking cam 28 is rotatably supported in relation to hollow shaft 54. Coupling 34 is shown diagrammatically as an axially displaceable element (arrow in the direction of actuation by means of actuator 50), although a radial coupling is also possible, of course. Control device 46 is connected to coupling 34 (or to actuator 50) via an electric cable 58. Control device 46 actuates the actuator for coupling 34 via cable 58.

Electromechanical converter 44, arranged inside inner knob 26, has a first element which is connected to hollow shaft 54 and a second element whose electrical output is connected to control device 46.

As shown diagrammatically at 62, the first element may be connected by a free wheel 62 to hollow shaft 54. Here this first element may also be designed as a flywheel mass (flywheel) to enable the electrical energy supply to be maintained for as long as possible.

It is also indicated diagrammatically, at 60, that inner knob 26 can be rigidly connected to locking cam 28 so that persons are able to lock and release door 12 from inside I without evidence of authorization.

Figure 5:
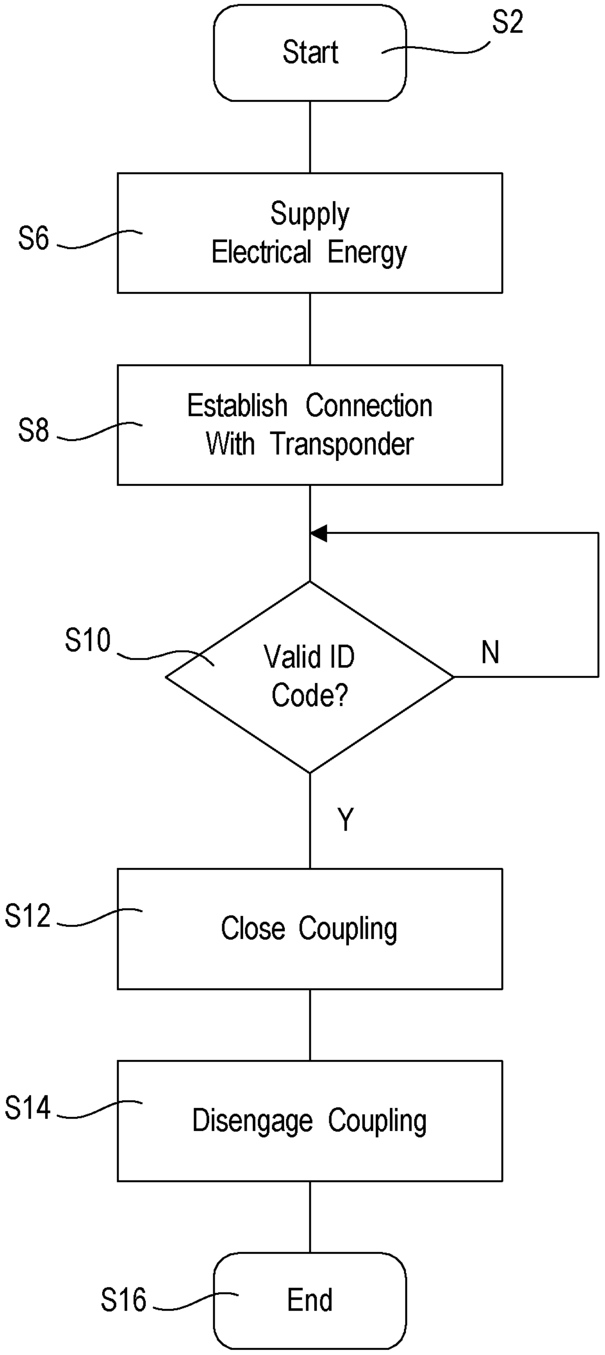
FIG. 5 shows a flow diagram of a preferred embodiment of the locking process according to the invention.

FIG. 5 shows a flow diagram of an embodiment of the method according to the invention.

The general process for carrying out a locking process for a lock commences at step S2 (starting step).

Energy conversion of actuating force 30 to electrical energy, and hence electrical energy supply to control device 46, takes place in a subsequent step S6 after an actuating element 24, 40 has been actuated.

Control device 46 establishes a wireless communication connection to transponder 22 in step S8.

In step S10 an inquiry is made to determine whether the signal received from transponder 22 contains a valid identification code. If this is the case (J (Y) in step S10), control device 46 actuates actuator 50 in step S12 to close coupling 34.

Person P, who has actuated actuating element 24, 40, may therefore actuate locking cam 28 by continuing the actuation, and therefore lock or release the lock of door 12.

After the lapse of a certain time, coupling 34 is disengaged in step S14, for example when the actuation of actuator 50 is terminated and coupling 34 is automatically returned to the disengaged position by means of an energy storage (a spring, for example).

The embodiment of the method according to the invention is terminated in step S16 and the method recommences before step S4.

The above description applies to a locking cylinder that can be unilaterally locked. In the case of a locking cylinder that can be locked on both sides, the actuating element may be outer knob 24 or inner knob 26.

Instead of a knob a pawl may be provided as actuating element.

Moreover, the insertion of a type of key may also serve for supplying energy. Here the energy is generated translatorily, unlike the rotatorily operating knob.

The invention claimed is:

1. A locking cylinder for installation in a lock, with a locking element for actuating a lock bolt, and an actuating element, wherein the actuating element is normally disengaged from the locking element throughout the full range of motion of the actuating element, and with a coupling for connecting the locking element to the actuating element after receiving an identification code from an associated transponder, wherein an electromechanical converter is associated with the actuating element via a hollow shaft, which converter converts an actuation of the actuating element into electrical energy which is used to support at least one of wireless communication with the transponder and the engaging of the coupling when a valid identification signal is received.

2. The locking cylinder according to claim 1, wherein the locking cylinder does not have an own energy source.

3. The locking cylinder according to claim 1, wherein the locking cylinder has a rechargeable energy source which is charged when the actuating element is actuated.

4. The locking cylinder according to claim 1, wherein the locking cylinder has a battery as the energy source.

5. The locking cylinder according to claim 1, wherein the transponder is an active transponder.

6. The locking cylinder according to claim 1, wherein the transponder is a passive transponder.

7. The locking cylinder according to claim 1, wherein the energy converter is an electrical generator which is arranged in the actuating element.

8. The locking cylinder according to claim 7, wherein the actuating element is coupled via a reduction gear to the electrical generator.

9. The locking cylinder according to claim 1, wherein the electro-mechanical converter has a flywheel for temporarily decoupling the duration of actuation of the actuating element from the communication and/or coupling process.

10. The locking cylinder according to claim 1, wherein the electromechanical converter converts the actuation of the actuating element into electrical energy when the actuation occurs while the actuating element is disengaged from the locking element.

11. A method for carrying out a locking operation for a lock, particularly that of a door, with the following steps:

actuating an actuating element of a locking cylinder of the lock, wherein mechanical energy is transmitted thereby via a hollow shaft;

converting the mechanical energy transmitted to the actuating element into electrical energy;

supplying a control device with the electrical energy, wherein the control device establishes wireless communication with a transponder;

receiving in the control device a code from the transponder and checking the same for validity; and actuating a coupling for connecting the actuating element to a locking element if the identification code received is valid, said coupling facilitating the full range of motion of said actuating element when said coupling is not actuated.

12. The method according to claim 11, wherein the energy for operating the control device and/or the coupling is generated directly by converting the mechanical energy transmitted to the actuating element into electrical energy.

13. The method according to claim 11, wherein the energy for operating the control device and/or the coupling is derived at least partially from a rechargeable electrical energy storage, which is chargeable by means of the mechanical energy transmitted to the actuating element.

14. The method according to claim 11, wherein the step of converting the mechanical energy transmitted to the actuating element into electrical energy occurs when the coupling is not actuated and the actuating element is disconnected from the locking element.

15. A locking cylinder for installation in a lock, with a locking element for actuating a lock bolt, and an outer knob, wherein the outer knob is normally disengaged from the locking element throughout the full range of motion of the outer knob, and with a coupling for connecting the locking element to the outer knob after receiving an identification code from an associated transponder, and with an electrical generator which is arranged in an inner knob, which generator converts an actuation of the outer knob into electrical energy which is used to support at least one of wireless communication with the transponder and the engaging of the coupling when a valid identification signal is received.

16. The locking cylinder according to claim 15, wherein the locking cylinder does not have an own energy source.

17. The locking cylinder according to claim 15, wherein the locking cylinder has a rechargeable energy source which is charged when the outer knob is actuated.

18. The locking cylinder according to claim 15, wherein the locking cylinder has a battery as the energy source.

19. The locking cylinder according to claim 15, wherein the transponder is an active transponder.

20. The locking cylinder according to claim 15, wherein the transponder is a passive transponder.

21. The locking cylinder according to claim 15, wherein the outer knob is coupled via a reduction gear to the electrical generator.

22. The locking cylinder according to claim 15, wherein the electro-mechanical converter has a flywheel for temporarily decoupling the duration of actuation of the outer knob from the communication and/or coupling process.

23. The locking cylinder according to claim 15, wherein the electrical generator converts an actuation of the outer knob into electrical energy while the outer knob is disengaged from the locking element.

24. The locking cylinder according to claim 15, wherein the outer knob extends via a through shaft into the inside of the inner knob.

25. The locking cylinder according to claim 15, wherein the through shaft is a hollow shaft, wherein the electrical generator is connected to the hollow shaft.

26. A locking cylinder for installation in a lock, with a locking element including a locking bit for actuating a lock bolt, and an actuating element, wherein the actuating element is normally disengaged from the locking bit throughout the full range of motion of the actuating element, and with a coupling for connecting the locking bit to the actuating element after receiving an identification code from an associated transponder; and wherein an electromechanical converter is associated with the actuating element via a hollow shaft, which converter converts an actuation of the actuating element into electrical energy which is used to support at least one of wireless communication with the transponder and the engaging of the coupling when a valid identification signal is received.

27. The locking cylinder according to claim 26, wherein the electromechanical converter converts the actuation of the actuating element into electrical energy when the actuation occurs while the actuating element is disengaged from the locking bit.

* * * * *